UNITED STATES PATENT OFFICE.

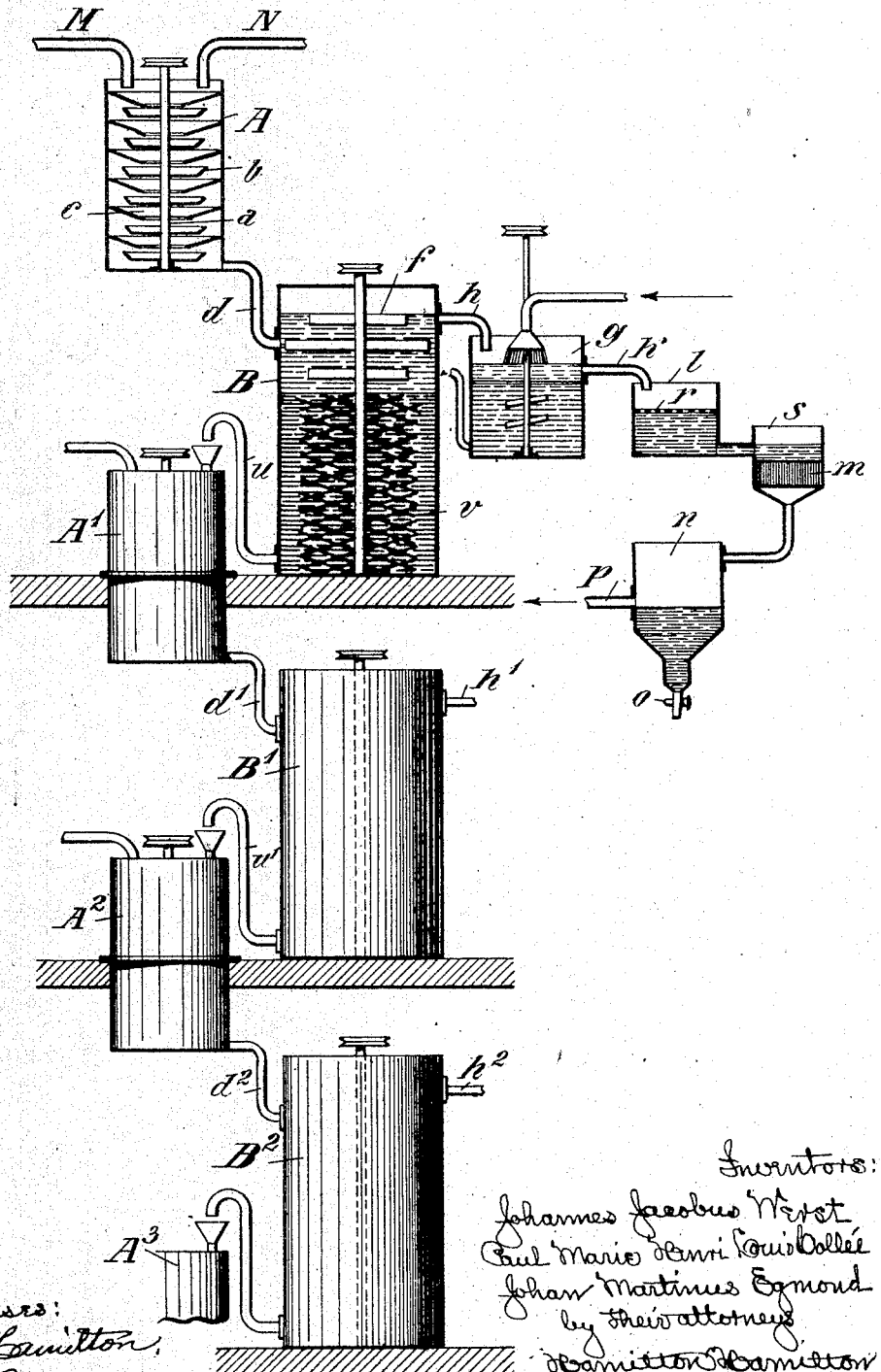

JOHANNES JACOBUS WERST, OF DELFT, AND PAUL MARIE HENRI LOUIS COLLÉE AND JOHAN MARTINUS EGMOND, OF ROTTERDAM, NETHERLANDS, ASSIGNORS TO NAAM-LOOZE VENNOOTSCHAP NEO CELLULOSE MATTSCHAPPIJ, OF ROTTERDAM, NETHERLANDS.

APPARATUS FOR SEPARATING FIBROUS MATTERS FROM ADMIXTURES.

1,175,854. Specification of Letters Patent. Patented Mar. 14, 1916.

Original application filed April 11, 1913, Serial No. 760,550. Divided and this application filed November 15, 1913. Serial No. 801,222.

*To all whom it may concern:*

Be it known that we, JOHANNES JACOBUS WERST, chemical engineer, subject of the Queen of the Netherlands, PAUL MARIE HENRI LOUIS COLLÉE, manufacturer, subject of the King of Belgium, and JOHAN MARTINUS EGMOND, subject of the Queen of the Netherlands, the first residing at the city of Delft, in the Kingdom of the Netherlands, and the second and third residing at Rotterdam, in the Kingdom of the Netherlands, have invented certain new and useful Improvements in Apparatus for Separating Fibrous Matters from Admixtures, of which the following is a specification.

The object of the invention is to provide a novel apparatus for separating fibrous waste material, such as waste paper, rags, saw-dust, and the like, from foreign matter and impurities, in a more efficient and economical manner than heretofore.

The essential feature of the improved invention consists in subjecting the fibrous matter, containing the admixtures, to the action of liquids of different specific weights, which are not miscible with each other, or only slightly so, and which have different degrees of affinity or attraction for the matter to be treated, one of the liquids employed tending to attract the foreign matter and the other the fibrous matter. For this purpose we may use two liquids only, or two or more mixtures of various liquids, the liquids being placed in a common vessel so that the fibrous matter will collect in one of the liquids and the foreign matter in the other liquid, this separation being assisted by agitating the liquids by stirring or shaking them. According to this invention therefore two or more solid bodies, as for instance, the said fibrous material and the said impurities and foreign matters, are separated from each other by using respectively two or more mutually immiscible liquids which serve as a separating medium and which, having carried out their separating effect, are subsequently separated from each other. For attaining the said purpose, means are provided for producing first the emulgation of the said immiscible liquids and further means are used for separating the liquids in emulsion from each other. In certain cases it is necessary to subject the separating liquids or the fibrous matter or foreign matter to preliminary treatment in order to render them capable of treatment by the apparatus. It has for example been found that certain pigments cannot, owing to their chemical composition, be separated from the fibers by the apparatus without preliminary treatment, this applying particularly to mineral pigments. The particular mode and sequence of operations depend on the particular requirements in each case; for instance, the fibrous matter may be ground or not ground before being subjected to the preliminary treatment or the separating treatment.

The following is an example of the use of the apparatus in connection with waste paper, for the purpose of eliminating printing ink, size and the like, and enabling the cellulose to be used for the manufacture of paper again: In the first instance the waste paper is boiled under pressure in a dilute solution of sulfite, as for instance sulfite of soda, so that the woody matter is converted into cellulose and a bleaching effect is produced, the effect of boiling under pressure being to accelerate the function of the apparatus and enable higher temperature to be employed without fear of the matter being disintegrated beyond the desired point by the development of steam bubbles, which would render the subsequent washing more difficult. The mass is then washed until it gives a neutral reaction and is ground, whereupon water is added thereto until a thin pulp with a low concentration of fibers is produced. This latter dilution may also be effected with a weakly acid liquor. This highly diluted pulp is then passed through the pipe M shown in the accompanying drawings into the apparatus A, while a suitable oil such as benzin is fed to the apparatus through a pipe N.

The apparatus used comprises a plurality of emulsifying appliances A, A', etc., and separators B, B', etc., alternating with each other and arranged in series, so that the liquid containing the fibrous matter passes from the first separator to the second emulsifying appliance, thence to the second separator and through the same to the third emulsifying apparatus and so forth, until the desired effect is obtained. Each emulsifying apparatus comprises a casing in the interior of which are mounted on a rotary spindle $a$ a number of superposed plates $b$ between which are disposed stationary dished plates or funnels $c$. This arrangement may be modified by making the plates $b$ stationary and the funnels $c$ rotary, or the plates and funnels may rotate in opposite directions. This motion of the plates or funnels or both subjects the thin pulp of fibrous matter, and the admixed benzin to centrifugal action, together with the dissolved admixtures and impurities, and produces an emulsion so that the smallest particles are brought into contact with the liquids. The mass flows from the apparatus A through the pipe $d$ to the separator B, in which a slowly revolving stirring device $f$ causes the specifically lighter liquid, in this case benzin, to rise, while the specifically heavier liquid, namely the liquid containing the fibers, descends. The benzin, containing the foreign matter, and floating at the top is drawn off through a pipe $h$ to another vessel $g$ into which runs a spray of water, this vessel serving to further separate any fibrous matter carried over by the benzin; a slowly rotating stirring device in the vessel $g$ causes the fibers to sink, the benzin at the top being conducted by a pipe $k$ to another vessel $l$ containing a sieve $r$ of fine mesh. Such sieve serves to collect any fibrous matter still present, but allows the benzin to flow through a pipe level with the bottom of the vessel $l$ into a vessel $s$ provided with a filter $m$, preferably of charcoal, the liquid passing therefrom into a vessel $n$ in which the benzin and water are separated, the benzin flowing out through a pipe $p$ and the water being drawn off at the base through a tap $o$.

In the separator, hereinbefore described, the specifically lighter liquid is separated from the specifically heavier liquid containing the fibrous matter, the latter being kept in slow movement by the slowly rotating stirring device $f$. In the lower part of the vessel B are a large number of thin pins $v$ which are secured to and project from the periphery of the shaft $f'$, such pins serving to accelerate the separation of the liquids by rotating the fiber particles, and allowing the specifically lighter liquid to ascend. The liquid containing the fibrous matter is then fed by a pipe $u$ to the second emulsifying apparatus A' and thence to the separator B' whence the gradually more and more purified fibrous mass is fed through the emulsifying and separating appliances $A^2$ and $A^3$, by pipes $u'$, $d^2$ until the paper fibers are free of all impurities. The stirrers $f$ and pins may be rotated by a common shaft or by two independent shafts. It is essential for efficient action of the separation that the stirrers $f$ and $v$ should rotate slowly in order that the liquids of specifically different weights are not again mixed one with another.

What we claim as our invention is:

1. An apparatus for separating fibrous material from foreign admixtures, such as printers' ink, impurities and the like, comprising a suitable container; means for introducing mutually immiscible liquids therein; means for producing an emulsion of said liquids and the mass to be acted on; and means for subsequently separating the said liquids from each other; one of said liquids having an affinity for the fibrous material and the other of said liquids having an affinity for the foreign substances mixed therewith.

2. An apparatus for separating fibrous material from foreign admixtures as printers' ink, impurities and the like, comprising a container, means for introducing mutually immiscible liquids therein, and means for producing the emulgation of the said immiscible liquids, said means consisting of a series of rotary plates for subjecting the immiscible liquids to centrifugal action and a series of funnels for carrying the emulsified mass to the center of the following plates.

3. An apparatus for separating fibrous material from foreign admixtures as printers' ink, impurities and the like, by using mutually immiscible liquids, consisting in a container and means for separating the immiscible liquids from their emulsion in said container, said means comprising needle-like agitators subjected to a slow movement in said emulsion.

4. An apparatus for separating fibrous material from foreign admixtures as printers' ink, impurities and the like, including a vessel; means for introducing mutually immiscible liquids therein; a series of rotary plates for subjecting the immiscible liquids to centrifugal action; a series of funnels for carrying the emulsified mass to the center of the following plates; another vessel; and slowly moving agitators contained therein for separating the said liquids from their emulsion.

5. An improved apparatus for separating fibrous waste material from foreign admixtures, as printers' ink, impurities and the like comprising emulsifying appliances alternating with separators, the latter having two stirring devices in a common case and on a common shaft, the one device at the upper part of the casing consisting of stirring arms the other device at the lower part consisting of long thin needles.

6. An improved apparatus for separating fibrous waste material from foreign admixtures, as printers' ink, impurities and the like comprising emulsifying appliances alternating with separators, the latter having two stirring devices in a common case and on separate shafts the latter having two stirring devices in a common case arranged on shafts independent from each other the one device at the upper part of the casing consisting of stirring arms the other device at the lower part consisting of long thin needles.

7. In an apparatus for separating fibrous waste matter from foreign admixtures as printers' ink, impurities and other foreign matter the combination of a series of emulsifying appliances alternating with separators with means for further separating any fibrous matter carried over by the benzin, consisting of a vessel $g$ into which runs a spray of water, of a slowly rotating stirring device in the vessel $g$ and of a pipe K to conduct the benzin to another separating vessel $l$.

8. In an apparatus for separating fibrous waste matter from foreign admixtures as printers' ink, impurities and other foreign matter the combination of a series of emulsifying appliances alternating with separators with means for further separating any fibrous matter carried over by the benzin, consisting of a vessel $l$ arranged after the vessel $g$, having a sleeve $r$ of fine mesh for collecting the fibrous matter still present, in combination further with a vessel $s$ communicating with said vessel $l$ and provided with a filter $m$ preferably of charcoal.

9. In an apparatus for separating fibrous waste matter from foreign admixtures as printers' ink, impurities and other foreign matter the combination of a series of emulsifying appliances alternating with separators with means for further separating any fibrous matter carried over by the benzin, consisting of a vessel $l$ arranged after the vessel $g$ the liquid passing therefrom into a vessel $n$ in which the benzin and water are separated, the benzin flowing out through a pipe $p$ and the water being drawn off at the base through a top $o$.

10. In an apparatus for separating fibrous matter from foreign admixtures as printers' ink, impurities and the like a system of devices, consisting of an emulsifying appliance A of a separator B and of a battery of vessels $g$, $l$, $s$, $n$ for further separating any fibrous matter carried over by the benzin and finally to recover at the end the latter, in condition separated from water.

11. In an apparatus for separating fibrous matter from foreign admixtures as printers' ink impurities and the like consisting of the plurality of a system of appliances each of them composed of the vessel A B $g$ $l$ $s$ $n$ combined with each other in series substantially as specified and illustrated.

In testimony whereof we have affixed our signatures in presence of two witnesses.
JOHANNES JACOBUS WERST.
PAUL MARIE HENRI LOUIS COLLÉE.
JOHAN MARTINUS EGMOND.
Witnesses:
A. H. KROGH,
J. W. FAFIE.